March 17, 1964
A. B. FOYE
METHOD OF PRODUCING ELASTOMERIC POLYMER GASKETS FOR CONTAINER CLOSURES
Filed May 9, 1962
3,125,459
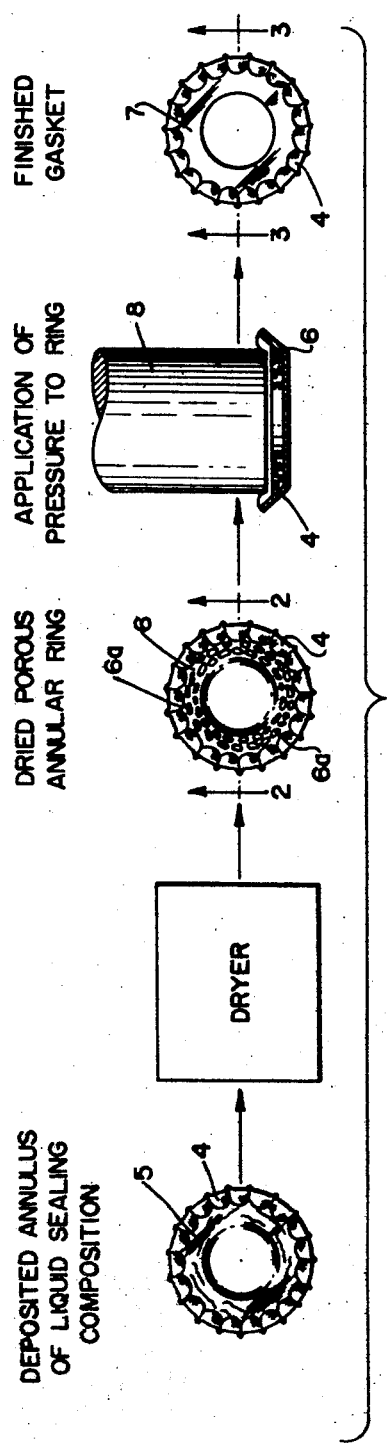
FIG. 1
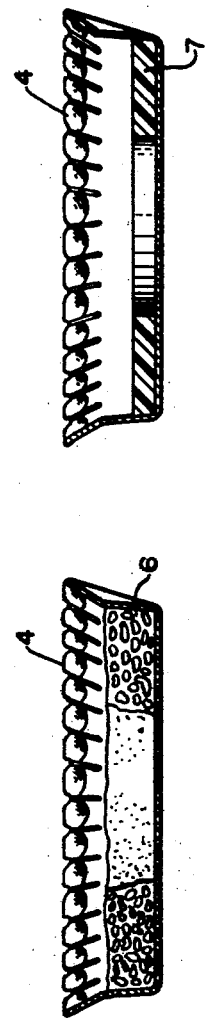
FIG. 2
FIG. 3

United States Patent Office 3,125,459
Patented Mar. 17, 1964

3,125,459
METHOD OF PRODUCING ELASTOMERIC POLYMER GASKETS FOR CONTAINER CLOSURES
Allen B. Foye, West Bridgewater, Mass., assignor to W. R. Grace & Co., Cambridge, Mass., a corporation of Connecticut
Filed May 9, 1962, Ser. No. 193,622
7 Claims. (Cl. 117—43)

This invention relates to the formation of sealing gaskets for container closures, and more particularly to gaskets for metal or plastic caps which are to be applied to glass jars and bottles.

A large proportion of container closures are provided with rubbery gaskets which have been deposited on the closures in the form of liquid gasketing compositions and then dried. While the rubbery gaskets so formed give generally satisfactory sealing performance, they also have certain drawbacks both in the method of their application and in the characteristics of the finished gaskets.

Gaskets deposited from water-dispersed rubber compositions, the so-called "flowed-in" gaskets, are subject to some variation in both width and thickness, particularly at the point on the closure where the stream of gasketing composition overlaps itself during application. The variation in thickness between this portion and other portions of the gasket may at times be as much as 25 percent, and may lead to poor sealing characteristics or even to complete failure of the gasket to produce a hermetic seal.

Gaskets of this type, furthermore, require a substantial time for drying, often 60 to 90 minutes, during which time the soaps and other protective, stabilizing ingredients in the composition tend to migrate toward and concentrate at the interface between the gasket and the closure. The result frequently is poor adhesion between the gasket and the closure or between the gasket and the protective coating on the closure.

It is an object of my invention, therefore, to develop a method by which dimensionally accurate sealing gaskets may be applied to container closures. In particular, my invention has for its object the elimination of the overlap area, and the formation of a gasket of substantially equal width and thickness throughout its whole extent. A further object is the development of increased adhesion between the gasket and the cap by preventing the migration of the stabilizing ingredients of the gasket composition to the gasket-cap interface. A still further object of my invention is the development of a method for applying gaskets which will be rapid and economical and will result in the formation of high quality, coherent gaskets having excellent sealing characteristics.

I have discovered that a dimensionally accurate solid gasket having good adhesion to a container closure may be made by depositing on the closure an annulus of a liquid gasketing composition based on a water dispersion of an elastomeric polymer, heating the deposited liquid composition to a relatively high temperature to drive off the water in not more than ten minutes, leaving behind on the closure a ring of elastomeric polymer containing a multiplicity of interconnected cells and having an open, porous surface, and thereafter applying pressure to the polymer ring to collapse the cells and form a compressed, solid, coherent gasket of the desired shape and dimensions.

In the accompanying drawing, FIGURE 1 is a diagrammatic view illustrating the successive steps of preparing a gasketed crown cap. FIGURE 2 is a cross-sectional view taken on line 2—2 of FIGURE 1 showing the porous dried sealing composition on an enlarged scale. FIGURE 3 is a cross-sectional view taken on line 3—3 of FIGURE 1 showing the finished gasket after compression of the porous composition.

According to the process of my invention, a water-based liquid container sealing composition 5 containing an elastomeric polymer in its dispersed phase is deposited on a cap 4, home canning lid or other container closure and the closure is then subjected to an elevated temperature, for example between 250° and 400° F., for a period of time not exceeding about ten minutes, until the water has been expelled from the composition. The dried gasket material 6 which is left behind on the container closure is not a solid mass, but has a porous spongy structure containing a large number of interconnected cells 6a and a pervious, open surface through which the water has been driven. The spongy mass is converted into an essentially solid, coherent gasket 7 by the application of pressure, as for example by passing the container closure under a die 8 which not only compresses, but imparts to the gasket 7 the desired shape and dimensions. The overlap area of the gasket is eliminated by the compression step, leaving the gasket of equal width the thickness throughout its extent. Adhesion of the gasket to the container closure is excellent. The compression step, furthermore, makes possible the production of a gasket of the exact contours which may be desirable for a given sealing job, a result which is ordinarily most difficult to achieve with flowed-in sealing gaskets. The gasket may, for example, have a perfectly flat sealing surface or it may, if desired, be provided with a bead at either its inside or outside peripheral edge. The gaskets of my invention, furthermore, have such a high degree of dimensional stability that they are able to maintain indefinitely the exact configuration imposed by the reshaping step. Placement of the gasket may also be determined during the compression step. Because of the exact control of configuration and placement of the gasket which is made possible by the process of my invention, I am able to use substantially smaller amounts of gasketing compound in the closure, with excellent sealing results.

It is essential that the dried gasket be cellular in nature so that it will be readily compressible and reshapable under pressure. Solid dried, gaskets can not be compressed, nor can they be given the exact configuration, dimensions and placement which are possible by the process of my invention. I have found that the open cell structure and pervious surface which result from rapidly driving the water out of the gasket give excellent results in the compression step of my invention. It is quite surprising, however, that a spongy gasket, once dried, can be compacted under pressure to form a coherent mass which retains the new configuration imposed upon it. Apparently the open-structured cellular mass which results from the quick-drying step possesses a substantial amount of inherent internal tackiness which allows the elastomeric polymer to be formed into a solid coherent mass following the disruption of the interconnected cells by the pressure applied to the gasket.

The discovery that a highly puffed, open-celled mass of gasketing material may be converted into a useful solid gasket by a simple compression step has other advantageous results in addition to those listed above. Liquid gasketing compositions normally require from 60 to 90 minutes for drying down to a solid gasket. It is most desirable from a procedural and economic point of view, as well as because of the above-mentioned adhesion problem, to reduce the drying period if at the same time a useful gasket can be made. My invention makes it possible to use highly puffed, quick-dried gaskets which otherwise would be unacceptable for sealing purposes, as well as to convert puffed masses into solid gaskets for certain uses where solid materials are more desirable.

The highly puffed gaskets which are produced when a liquid gasketing composition is dried in less than 10 minutes are frequently unacceptable as sealing gaskets for container closures. The properties of the gaskets will vary to some extent depending on the drying conditions and particularly on the composition of the liquid gasketing material deposited on the closure. The dried, puffed gaskets may be cracked or blistered to such an extent or may be so weak and spongy that they are incapable of giving good sealing performance, or they may be so pervious that they allow penetration of moisture or liquids from the pack in the container to penetrate through to the container closure, thus destroying adhesion between the gasket and the closure. On the other hand, even when the dried puffed gasket is capable of good sealing performance, its spongy nature may make it less desirable for certain purposes than the more conventional solid gaskets. The use of a spongy gasket in home canning lids, for example, may interfere with the venting of pressure from within the container during the processing step, thus making it impossible to achieve the necessary vacuum within the container. Puffed gaskets have been found, furthermore, to interfere with the removal of screw caps from their containers. Comparative tests have shown that the force needed to remove screw caps equipped with puffed gaskets is considerably higher than that needed when solid gaskets are used. Apparently the lip of the container penetrates further into the spongy gasket, thus substantially increasing the area of friction between the container lip and the gasket. Finally, puffed gaskets are often less desirable in appearance than the conventional solid gaskets, a factor which is particularly important when the container closure is supplied directly to the ultimate consumer, as in the case of lids for home canning. In all the above instances, it is most desirable to convert the quick-dried puffed gasket into a solid, coherent gasket by compacting the cellular mass prior to the application of the closure to a container.

The drying step may be carried out at any temperature which will produce substantial puffing in the compound by driving the water out of the gasket in not more than about 10 minutes. I have found that in general, temperatures in the range between about 250° F. and about 400° F. are suitable. At these temperatures, the gaskets ordinarily used for sealing glass jars and bottles, which are about 0.060 inch thick in their puffed state, will dry in from one to three minutes. Gaskets for use on pail covers, however, are much thicker, about 0.300 inch, and will require from five to ten minutes. On the other hand, the very thin gaskets sometimes used for special sealing jobs, about 0.020 inch thick, may dry in as little as 30 seconds. The thickenss of the metal or other material from which the container closure is made will also have some influence on the speed of drying, and consequently must be taken into account in determining a temperature at which the gaskets are dried. Drying is preferably carried out in an oven of the type described in United States Patent No. 2,610,131, in which heated, high velocity air is passed over the material to be dried.

For best results, the spongy gasket must be substantially completely dry, or must contain at most not more than about 5 percent and preferably not more than about 2 percent of moisture at the time the reshaping step is carried out. When larger amounts of water are present at the time of compression, the adhesion of the gasket to the cap may be seriously impaired by the compression operation.

The step of reshaping the gasket may be carried out at any pressure which is capable of disrupting the spongy structure and impressing the desired final shape on the gasket. The range of pressures which may be used may easily be determined by any person skilled in the art and therefore does not form a part of my invention. Likewise, the temperature at which the reshaping is done is a matter of convenience and choice, although for many purposes it is preferable to work at or only slightly above room temperature in order to avoid damage to the protective coating or lacquer on the container closure.

The gaskets of my invention, in their dried, spongy state, must be easily compressed and must have enough natural coherence so that the gasket material will form a strong, compact mass when pressure is applied to it. I have found that natural rubber latex is most satisfactory in this respect, and for this reason natural latex is a preferred material for carrying out my invention. Water dispersions of other elastomeric polymers may be used, however, such as for example latices or water dispersions of butadiene-styrene copolymers, butadiene-acrylonitrile copolymers, butadiene-styrene-acrylonitrile terpolymers, polychloroprene (neoprene), polysulfide rubber (Thiokol), and butyl rubber. The gasket material should not be too highly cured before the compression step, so that it will possess the necessary compressibility and coherence to form a solid gasket.

There are a number of ways in which the escape of water from an annulus of liquid sealing composition may be facilitated, thus increasing the drying rate and fostering the production of an open-structured cellular mass. Any modification of the liquid compound which tends to prevent the formation of a continuous film or skin over the surface, and to provide openings through which the water may evaporate will have this effect. The gasketing compositions may, for example, contain finely divided fillers in amounts sufficient to interfere with the formation of a continuous surface film of elastomer. The inclusion of finely dispersed air or other gas, for example nitrogen, in the composition is another and very important means of increasing the rate of drying. The presence of pockets of air or other gas in the composition helps to prevent the formation of a continuous film over the surface of the composition and provides channels for the escape of the water vapor. The gas should preferably be very finely dispersed in the composition in order to have the greatest effectiveness and to make possible the production of evenly puffed, small-celled porous gaskets.

The air or other gas may be introduced into the liquid sealing composition in any desired manner, as for example by stirring the composition, by bubbling compressed gas into it, by introducing a separately prepared foam or soap-suds or by the use of a blowing agent. Since these methods tend to introduce large bubbles of gas into the mixture, however, it is often preferable to introduce finely dispersed air into the liquid composition together with whatever fillers are to be added. It is a well known fact that large quantities of air are occluded on or otherwise associated with finely divided filler materials and that air in finely divided form is introduced into a water dispersion of elastomer by adding fillers to the dispersion. The fillers may be added as dry powders if the dispersion is sufficiently stabilized or may first be stirred into a solution of the stabilizer. Wetting the fillers with plain water before adding to the dispersion is not practical for the purposes of my invention since the occluded air is displaced by the water and, as a result, no air will be carried into the liquid composition. On the other hand, if the fillers are first dispersed in a water solution of a stabilizing soap, the air is entrapped in the form of very fine bubbles which are evenly dispersed through the stabilizer solution. When the filler dispersion is added to a water dispersion of elastomeric polymer the fine air bubbles become evenly distributed throughout the liquid composition. Gaskets deposited from such a composition and rapidly dried have a fine even cell structure and are particularly well adapted to reshaping under pressure according to the process of my invention.

The presence of a gas in the liquid sealing composition has other and very important effects. As set forth above, the protective, stabilizing materials in water-based gasketing compositions tend to migrate to the gasket-closure interface during the drying and coagulation step as ordinarily carried out. The gas cells present in the gasketing compositions of my invention seem to act as reservoirs or traps for the stabilizing materials, and to minimize their migration toward the closure, with the result that the gaskets of my invention exhibit unusually high adhesion to the container closures. In addition, the finely dispersed gas, together with the fillers, prevents the formation of a continuous film or skin of elastomer over the top of the gasket during the drying step. Since the gasket material remains open and porous, the water is allowed to escape quite readily from the mass, and very rapid drying is possible. Rapid evaporation of the water through the porous mass, furthermore, has a sufficient cooling effect so that even at the high oven temperatures used in the process of my invention, the water within the compound does not boil. It is important to prevent boiling from taking place if possible, in order to minimize blistering of the gaskets. Rapid drying, of course, has the added and very important advantage that it permits faster production of gasketed container closures, and cuts down substantially on both the amount of fuel used in the drying ovens and on the oven space necessary.

The finely divided gas may be introduced into the liquid sealing compositions in any desired amounts. Even very small proportions of dispersed gas, for example 5 or 10 percent of the volume of the liquid composition, have a favorable effect on the speed of drying and the nature of the resulting cellular mass. Excellent results have been obtained with about 20 percent by volume of dispersed gas. The upper limit to the amount of gas dispersed in the compound is determined chiefly by practical considerations such as extra bulk of the compound, ease of handling etc. In general, I prefer to incorporate not more than about 30 percent of gas into the liquid composition.

The proportions of fillers in the compound is not critical, likewise, but it is preferred to add sufficient filler so that the compound does not form an impermeable skin during drying. I have found in general that proportions of about 200 to about 900 parts by weight of finely divided filler to 100 parts of elastomer solids will give the desired results.

My invention will be more clearly understood by reference to the following examples, in which all parts are by weight.

*Example I*

A mixture of 50 parts of oleic acid, 50 parts of paraffin oil, 150 parts of water and 20 parts of 28 percent ammonia was stirred together until thoroughly mixed. 15 parts of iron oxide and 2000 parts of barytes were slowly added to the mixture and stirring was continued until a smooth dispersion of the fillers had been obtained. 600 parts of a 60 percent concentrated natural rubber latex was then added to the filler dispersion, followed by the addition of 300 parts of latex grade talc. Stirring was continued until the compound was smooth, after which enough 14 percent bentonite solution and 5 percent gum karaya solution were added to give the compound the desired rheological properties.

The gasketing composition made by the above procedure was found to contain a considerable amount of air in the form of very small bubbles dispersed throughout the compound. The air present amounted to about 20 percent of the volume of the compound, and was dispersed in such stable form that the compound could be stored for several months with substantially no loss of air.

In order to avoid pre-curing of the compound, a separate curing component was made and was added to the compound immediately before its use. The curing component consisted of 3 parts of sulfur, 3 parts of butyl zimate (zinc dibutyl dithiocarbamate), 10 parts of zinc oxide and 16 parts of water, which were ball milled for thorough mixing. This was stirred into the gasketing composition and the composition was then applied through a nozzle to a series of metal caps.

The caps were placed in an oven at 380° F. for about 1 minute and were then withdrawn and cooled to room temperature. The gasketing composition was found to have dried completely, and to have been converted into a highly puffed mass with small, evenly distributed, interconnected air cells. The cellular mass, furthermore, was found to have a completely open structure, that is the surface of the gasket was not a solid film but was pierced by a multitude of tiny, openings which connected with the cells within the gasket.

The cellular mass was not an acceptable gasket material. It was weak and spongy, and when used as a sealing gasket with glass jars gave an unusually high percentage of improperly sealed jars. In order to convert the cellular mass into a useful gasket, the caps were passed under a die and a pressure of 325 pounds per square inch was applied to the puffed gaskets. The puffed structure was collapsed by the pressure, and the resulting gaskets were smooth, coherent, of very even thickness, and exhibited excellent adhesion to the caps. In particular, the gaskets had no uneven portion at the area where the liquid compound had overlapped during application. All traces of the overlap area had been removed by the pressing operation.

The ammoniacal soap used as a stabilizer in the liquid gasketing composition of the above example apparently serves a double purpose. This soap is decomposed on heating, and the ammonia which is driven off acts as an additional blowing agent during the puffing of the gasket. The free fatty acid produced on decomposition of the soap then reacts with the zinc in the curing component, with the precipitaion of an insoluble zinc soap. The presence of such an insoluble soap in the dried film greatly increases the water-resistance of the gasket material. Ammonium soaps of other fatty acids and of rosin acids may also be used. Alternatively, although the ammonium soaps are the preferred stabilizers for the reasons set forth above, the alkali metal soaps may also be used in the process of my invention.

*Example II*

A liquid gasketing composition was made by stirring into 161 parts of a 62 percent natural rubber latex an amount of 3 parts of a 33 percent solution of sodium lauryl sulfate and 200 parts of finely divided dry calcium carbonate. In this case, a substantial amount of air was introduced into the compound with the dry filler. The compound was applied to a series of home canning lids which were then placed in an oven at a temperature of 300° F. for one minute. The highly puffed, uneven surfaced cellular gaskets which resulted from the drying step were passed under at die as shown in Example I, and were compacted to form smooth, even, solid gaskets.

*Example III*

The method shown in Example II is followed, using a 60 percent solids water dispersion of a 70–30 butadiene-styrene copolymer in place of the natural latex, and sodium oleate in place of the sodium lauryl sulfate. The cellular gaskets are similar to those obtained in Example II and may be compacted to given smooth, solid gaskets.

The gaskets made according to the above example were smooth, coherent, dimensionally accurate and had generally excellent sealing characteristics. The properties of the gasket were, in fact, quite unexpected in view of my previous experience with the manufacture of gasketing material for container closures. It has long been the practice in making such water-dispersed gasketing materials to eliminate all air from the composition, in order to prevent the formation of air bubbles and holes in the gaskets. For this reason the gasketing material has ordinarily been subjected to vacuum during manufacture. In carrying out the process of the above examples, on the other hand, I have deliberately incorporated air into the liquid composition in order to facilitate the rapid drying, and to foster the formation of an open-structured cellular mass, which may be compacted to give solid coherent gaskets.

This application is a continuation-in-part of application Serial No. 6,878, filed February 5, 1960, now abandoned.

I claim:

1. A method of making a gasket for a container closure which includes the essential steps of applying to the closure an annulus of a fluid comprising a water dispersion of an elastomeric polymer, heating said annulus to a relatively high temperature to drive off the water in not more than 10 minutes, leaving behind on the closure a ring of elastomeric polymer containing a multiplicity of interconnected cells and having an open, porous surface, and thereafter compressing said polymer ring to collapse the cells and form an essentially solid, coherent gasket of the desired configuration, the step of compressing the gasket being carried out prior to the application of the closure to a container.

2. The method of claim 1 in which the said elastomeric polymer is selected from the group consisting of natural rubber, butadiene-styrene copolymers, butadiene-acrylonitrile copolymers, butadiene-styrene-acrylonitrile terpolymers, polychloroprene, polysulfide rubber, butyl rubber and mixtures thereof.

3. The method of claim 1 in which the drying temperature is between 250° and 400° F.

4. The method of claim 1 in which the said fluid contains a gas finely dispersed therein.

5. The method of claim 4 in which the gas dispersed within said fluid is air.

6. A method of making a dimensionally accurate, adherent gasket for a container closure which includes the steps of applying to the closure a water-dispersed liquid gasketing composition containing a rubber latex, an ammoniacal soap as a stabilizer for the latex and finely divided filler materials, said liquid composition having between about 5 percent and about 30 percent of air finely dispersed therein, subjecting the closure to a temperature between about 250° F. and about 400° F. for a period of not more than about 10 minutes thereby converting the deposited liquid composition into a substantially dry, open-structured cellular mass and finally compressing the cellular mass in order to form a coherent gasket of the desired shape and dimensions.

7. The method of claim 6 in which the said water-dispersed liquid gasketing composition is made by forming a water dispersion of at least the major proportion of the mineral fillers with the ammoniacal soap as the dispersing agent and then mixing the rubber latex with the filler dispersion.

References Cited in the file of this patent

UNITED STATES PATENTS

| | | |
|---|---|---|
| 1,427,133 | Taliaferro | Aug. 29, 1922 |
| 2,114,308 | McGowan et al. | Apr. 19, 1938 |
| 2,336,944 | Madge et al. | Dec. 14, 1943 |
| 2,684,774 | Aichele | July 27, 1954 |
| 2,706,183 | Carter | Apr. 12, 1955 |
| 3,032,826 | Brillinger | May 8, 1962 |
| 3,037,474 | Navikas | June 5, 1962 |

FOREIGN PATENTS

| | | |
|---|---|---|
| 615,282 | Canada | Feb. 28, 1961 |